United States Patent
Gonzalez

(10) Patent No.: US 9,467,738 B2
(45) Date of Patent: Oct. 11, 2016

(54) PERSONAL AREA NETWORK PROXY SERVICE FOR VIDEO ON DEMAND SYSTEMS

(71) Applicant: George E. Gonzalez, McLean, VA (US)

(72) Inventor: George E. Gonzalez, McLean, VA (US)

(73) Assignee: BLUTETHER LIMITED, Hamilton (BM)

( * ) Notice: Subject to any disclaimer, the term of this patent is extended or adjusted under 35 U.S.C. 154(b) by 120 days.

(21) Appl. No.: 14/138,479

(22) Filed: Dec. 23, 2013

(65) Prior Publication Data

US 2015/0181286 A1    Jun. 25, 2015

(51) Int. Cl.
| | |
|---|---|
| H04N 7/173 | (2011.01) |
| H04N 21/4363 | (2011.01) |
| H04N 21/61 | (2011.01) |
| H04N 21/41 | (2011.01) |
| H04N 21/258 | (2011.01) |
| H04N 21/472 | (2011.01) |

(52) U.S. Cl.
CPC .. *H04N 21/43637* (2013.01); *H04N 21/25875* (2013.01); *H04N 21/4126* (2013.01); *H04N 21/47202* (2013.01); *H04N 21/6143* (2013.01); *H04N 21/6175* (2013.01); *H04N 21/6181* (2013.01)

(58) Field of Classification Search
CPC .......... H04N 21/2225; H04N 21/231; H04N 21/232; H04N 21/47202; H04N 21/2542; H04N 21/2543; H04N 21/2547; H04N 21/25808; H04N 21/26225
USPC ............. 725/4, 80, 81, 82, 85, 87, 100, 133, 725/141, 153
See application file for complete search history.

(56) References Cited

U.S. PATENT DOCUMENTS

| | | | |
|---|---|---|---|
| 5,884,190 A | 3/1999 | Lintula et al. | |
| 2002/0032904 A1 | 3/2002 | Lerner | |
| 2004/0083485 A1 | 4/2004 | Russ et al. | |
| 2005/0216941 A1 | 9/2005 | Flanagan et al. | |
| 2007/0124779 A1* | 5/2007 | Casey | H04N 7/17318 725/87 |
| 2007/0162930 A1* | 7/2007 | Mickle | H04L 41/5054 725/37 |
| 2007/0171854 A1 | 7/2007 | Chen et al. | |
| 2007/0180485 A1 | 8/2007 | Dua | |
| 2009/0233715 A1* | 9/2009 | Ergen | G08C 17/02 463/41 |
| 2009/0320077 A1 | 12/2009 | Gazdzinski | |
| 2010/0016011 A1 | 1/2010 | Alen | |
| 2010/0037057 A1 | 2/2010 | Shim et al. | |
| 2010/0087167 A1 | 4/2010 | Tsurutome et al. | |
| 2010/0146601 A1* | 6/2010 | Bunch | G06F 21/10 726/6 |
| 2010/0267368 A1 | 10/2010 | Masputra | |

(Continued)

FOREIGN PATENT DOCUMENTS

| | | |
|---|---|---|
| CN | 101605332 A | 12/2009 |
| CN | 102368831 A | 3/2012 |

(Continued)

Primary Examiner — Nnenna Ekpo
(74) Attorney, Agent, or Firm — Thompson Coburn LLP

(57) ABSTRACT

Techniques where a computing device such as a smart phone can be leveraged to facilitate video on demand ("VOD") services through a set top box ("STB") associated with a content subscription service such as satellite television are described. In an exemplary embodiment, a request for VOD content can be communicated from the STB to the computing device via a personal area network ("PAN") connection such as Bluetooth. The computing device in turn can forward the VOD content request to a VOD authorization server over a wide area network ("WAN").

71 Claims, 7 Drawing Sheets

(56) References Cited

U.S. PATENT DOCUMENTS

| | | |
|---|---|---|
| 2011/0035766 A1 | 2/2011 | Reynolds |
| 2011/0074794 A1* | 3/2011 | Felt .................... H04N 21/4122 345/520 |
| 2011/0307188 A1 | 12/2011 | Peng et al. |
| 2012/0014464 A1 | 1/2012 | Eiger et al. |
| 2012/0039248 A1 | 2/2012 | Schneider et al. |
| 2012/0047549 A1 | 2/2012 | Brown et al. |
| 2012/0191481 A1 | 7/2012 | Kaminski et al. |
| 2012/0330950 A1* | 12/2012 | Pichumani .......... H04L 65/4076 707/736 |
| 2013/0035086 A1 | 2/2013 | Chardon et al. |
| 2013/0042263 A1* | 2/2013 | Reynolds ........... G06Q 30/0207 725/23 |
| 2013/0139196 A1 | 5/2013 | Sokolov et al. |
| 2013/0145406 A1 | 6/2013 | Baskaran et al. |
| 2013/0227284 A1 | 8/2013 | Pfeffer et al. |
| 2013/0347025 A1* | 12/2013 | Prakash ............. H04N 21/2541 725/25 |
| 2014/0351834 A1* | 11/2014 | Srivastav ........... H04N 21/4126 725/1 |

FOREIGN PATENT DOCUMENTS

| | | |
|---|---|---|
| CN | 102905172 A | 1/2013 |
| CN | 203057206 U | 7/2013 |
| FR | 2934109 A1 | 1/2010 |
| KR | 20040022724 A | 3/2004 |
| WO | 0221835 A1 | 3/2002 |
| WO | 2012071840 A1 | 6/2012 |

* cited by examiner

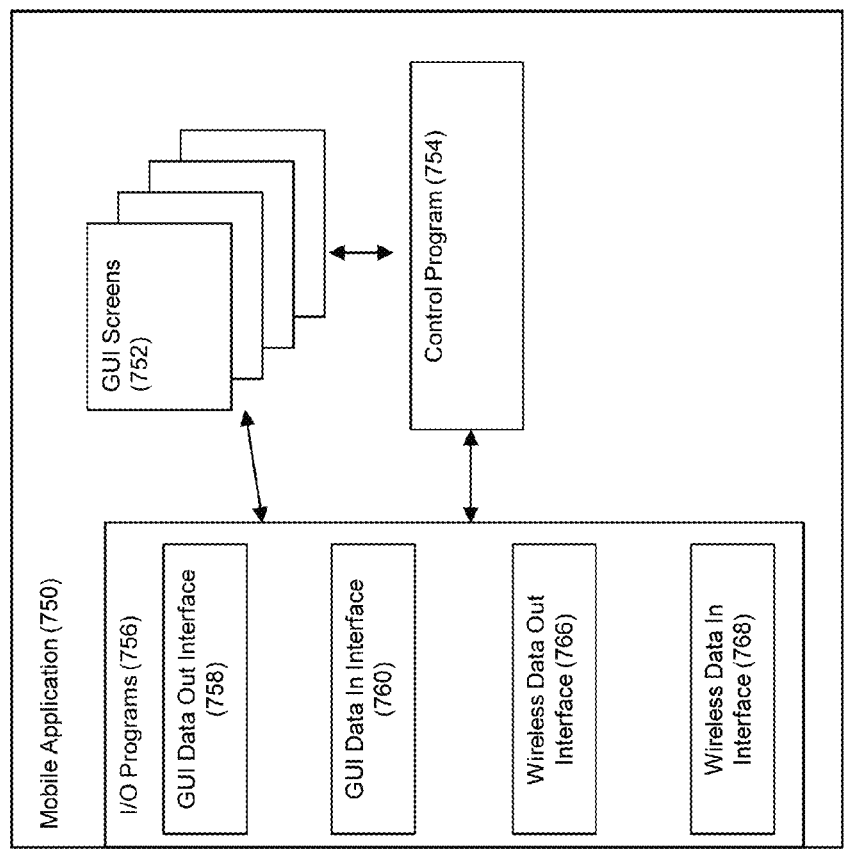
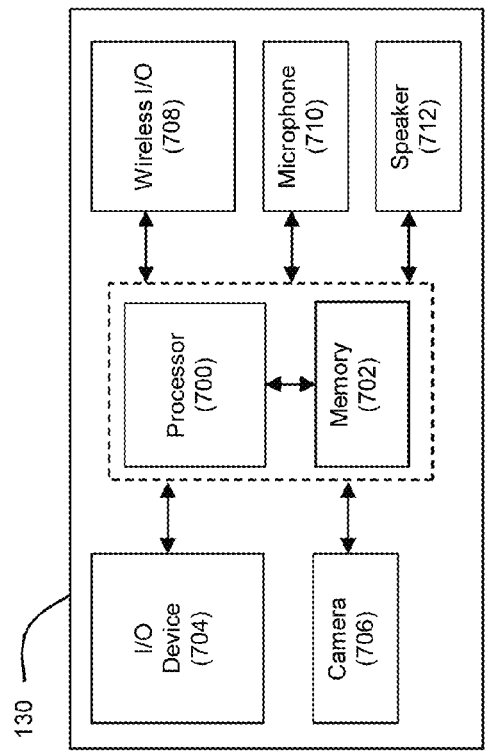
Figure 7(a)
Figure 7(b)

PERSONAL AREA NETWORK PROXY SERVICE FOR VIDEO ON DEMAND SYSTEMS

INTRODUCTION

Many consumer devices, such as televisions, Blu-ray players, automobiles, refrigerators, thermostats, and the like, do not have access to the Internet. Many of these consumer devices are capable of network communication, but cannot access a wide area network, such as the Internet, without a gateway or a carrier provided plan. Giving these consumer devices access to the Internet would provide much greater functionality. Conventionally, providing Internet access to consumer electronics required a user to purchase additional service accounts from service providers, which increased customer cost. There is needed in the art a method for providing consumer electronics Internet connection without increasing cost to the customer.

One such example of a consumer device needing Internet access is a set top box ("STB") offering Video on demand ("VOD") services. VOD is a system and service offered by many cable and satellite providers that allow viewers to select and watch videos on demand. After a user makes a VOD selection, VOD media may be streamed or downloaded to a viewer's STB. Conventional STBs generally provide viewers with access to a VOD channel or menu where viewers may search for and find television programs, movies, or other videos. Some programs may be free or included with the viewer's cable or satellite subscription, while other programs may be pay-per-view or rented. Like any traditional DVD movie, VOD selections and purchases require a specific license from the content producer (e.g. Hollywood studio), which may be acquired through a subscription or bought when the media is rented or purchased. Generally, cable and satellite providers acquire licenses from the content producers on behalf of their customers. So, cable and satellite providers must track VOD selections as a condition of licensing agreements with content producers.

Typically, cable and satellite service providers are required by content studios to authenticate VOD rentals and purchase selections by authenticating the VOD selections through a two-way communication medium. To track VOD selections, cable and satellite providers receive a communication from the STB notifying the cable or satellite provider that the user has selected VOD content. More specifically, conventional VOD uses a two-way communication medium where content is sent to the viewer's STB and messages about VOD purchases and selections are received from the viewer's STB. For cable television providers, the requisite two-way communication already exists in the coaxial cable connection between the STB and the cable company. The same is true for newer, fiber optic-based content provider companies (e.g. Verizon FIOS). However, satellite companies have a problem because satellite dishes are generally unidirectional in that they are capable of receiving satellite communications from the satellite provider's satellite but they are not configured to send data from the STB back to the provider via the satellite link.

Satellite companies in countries that have a pre-existing infrastructure that supports wired communications, such as the United States and Canada, assume that most households have an internet connection, which is generally a broadband connection. So, the two-way communication problem is solved by connecting the STB to the household's internet connection, such as through an Ethernet port or a Wi-Fi network. While this solution works well in countries where broadband is prevalent, some countries, such as India and Indonesia, do not have wide-spread availability of landline or broadband connections because they lack the necessary infrastructure. These developing countries largely skipped the cable laying development process and instead opted for mainly wireless connections, such as cellular connections. So, in countries such as India or Indonesia, many people do not have access to a broadband connection simply because of the expense to lay the cables where large segments of the population live. As a result, the conventional satellite VOD solution whereby the STB is connected to a broadband link would fail to help large segments of the population.

Two conventional satellite VOD procedures that avoid the need for a wired broadband have been attempted. First, an SMS text messaging-based procedure was attempted. When a viewer decided upon a VOD program, the STB generated a notification instructing the viewer to text a program-specific code to the satellite provider's VOD phone number. After receiving the SMS, the satellite provider responded with a message that included an authorization code. The user then inputted the authorization code into the STB, and the selected program would eventually begin playing. This procedure was frustrating to the viewer because it required the viewer to perform cumbersome steps involving drafting and sending a text message and inputting an authorization code into the STB. This procedure also caused problems for the satellite provider because authorization codes could be shared among viewers, and some viewers were able to watch programs illegally using the shared code without acquiring a license.

The second conventional satellite VOD procedure that avoids the need for a wired broadband used inserted a GSM cellular module into the STB. The STB would use the GSM module to send a cellular communication to the satellite provider notifying the satellite provider of the selected VOD program so that a license could be acquired for the viewer. While this procedure limited the number of cumbersome steps for the viewer, it greatly increased the service provider and viewer cost. First, the GSM module made the STB more expensive for the viewer or the satellite company to buy, and the viewer needed to purchase a service plan from a cellular provider merely to enable their STB to communicate wirelessly via the GSM module. The service plan added another monthly charge to an already expensive television subscription.

In view of the shortcomings of these known VOD techniques, the inventors believe that a need in the art exists for different and improved technologies to support VOD service.

Toward this end, the inventors disclose a number of exemplary embodiments whereby a wireless personal area network is used to notify a content provider of VOD selections.

For example, a computing device with its own wireless networking capabilities such as a smart phone, tablet computer, or iPod can be used as a proxy through which the STB can communicate requests for VOD content and/or the Internet to a remote server that determines whether the VOD content request should be granted. The computing device can have both a personal area network ("PAN") connection and a wide area network ("WAN") connection. The PAN connects the computing device to the STB using any PAN technology (e.g., Bluetooth low energy ("BLE") or Zigbee). The WAN connects the computing device to the Internet, and more specifically, to a satellite provider VOD server through the WAN. The computing device can execute an application (an "app") to make the computing device serve as a proxy for sending messages sent from a consumer device connected to the computing device through the PAN and in essence "tethering" the consumer device to the Internet via the App on the computing device that has access to both PAN and WAN communications. According to this method, a viewer's existing cellular data service plan and connection associated with his/her computing device can be leveraged so that no additional service plans are required for the viewer to send messages from the consumer device to a remote server through the WAN. The computing device creates the proxy service and extends WAN connection to the consumer device without a tethering plan provided by a carrier and without making any phone calls.

Also, in some exemplary embodiments, a PAN transceiver can be added to the STB to enable the STB to support PAN-based communication with the computing device.

In one embodiment, a system for authorizing VOD purchases comprises: an STB configured to receive commands and selections from a user, generate a VOD authorization request in response to a VOD selection from a user, and play the VOD selection in response to receipt of an authorization message; a PAN transceiver unit in communication with the STB, wherein the PAN transceiver is configured to send the VOD authorization request or other messages from the STB over a PAN connection according to a PAN protocol in response to a command from the STB; a computing device comprising a processor, a memory, a PAN transceiver, and a WAN transceiver, wherein the computing device's processor is configured to execute computer readable instructions defined by an application installed on the computing device and stored in the computing device's memory, wherein the instructions are configured to (1) receive the VOD authorization request or other messages over the PAN from the PAN transceiver unit through the computing device's PAN transceiver and (2) send the VOD authorization request or other messages over a WAN according to a WAN protocol; and a VOD authorization server configured to (1) receive the VOD authorization request over the WAN from the computing device, (2) generate the authorization message, and (3) send the authorization message.

In another embodiment, a method for authorizing VOD purchases comprises: receiving, by an STB, a selection of VOD content from a viewer; establishing a PAN connection between the STB and a computing device within a wireless range of a PAN transceiver that communicates with the STB, wherein the computing device and the STB re-establish the PAN connection when either the STB or the computing device detects presence of the other device to re-establish the PAN connection automatically; sending, by the STB, a VOD request message to the computing device over the PAN, wherein the VOD request message at least describes the VOD content selection from the viewer; sending, by the computing device, the VOD request message over a WAN to a VOD authorization server after receiving the VOD request message over the PAN; and beginning playback, by the STB, of the selected VOD content after the VOD authorization server authenticates the VOD selection.

In another embodiment, a computer program product comprises: a plurality of processor-executable instructions, the instructions being resident on a non-transitory computer-readable storage medium of a computing device and being configured, upon execution by a processor, to: pair the computing device with a second device via a PAN connection; receive a message from the second device over the PAN connection; reassemble the received message according PAN protocols; assemble the received message according to a WAN protocol; and send the received message to a remote server over a WAN connection according to the WAN protocol.

In another embodiment, an apparatus comprises: a WAN transceiver configured to send and receive data over a WAN connection; a PAN transceiver configured to establish a PAN connection with an STB; and a processor configured to: establish a PAN connection with the STB via the PAN transceiver; access data that is indicative of a content subscription account; receive data indicative of a VOD content selection; based on the accessed and received data, send data to a remote server via the WAN transceiver and the WAN connection to thereby permit the remote server to determine whether the content subscription account is authorized for viewing the VOD content selection, the sent data comprising (1) data indicative of the VOD content selection, and (2) data indicative of the content subscription account; and wherein the PAN transceiver, the WAN transceiver, and the processor are resident on a member of the group consisting of (1) a smart phone, (2) a tablet computer, and/or (3) a mobile handheld computing device such as an iPod or mobile phone.

In another embodiment, a proxy method for enabling VOD purchases, the method comprises: storing data that is indicative of a content subscription account in a memory; receiving data indicative of a VOD content selection; retrieving the stored data indicative of the content subscription account; in response to the receiving and retrieving steps, sending data to a remote server via a WAN connection to thereby permit the remote server to determine whether the content subscription account is authorized for viewing the VOD content selection, the sent data comprising (1) data indicative of the VOD content selection, and (2) data indicative of the content subscription account; and wherein the method steps are performed by a computing device, the computing device comprising a member of the group consisting of (1) a smart phone, (2) a tablet computer, and/or (3) a mobile handheld computing device.

In another embodiment, a PAN unit comprises: a PAN transceiver configured to establish a PAN connection with a computing device; and a processor configured to (1) receive, from an STB, data indicative of a VOD content selection or other messages, and (2) send data indicative of the VOD content selection to the computing device via the PAN transceiver and the PAN connection to permit the computing device to communicate data indicative of the VOD content selection or other messages to a remote server via the another network connection.

In another embodiment, a proxy method for enabling VOD service, the method comprises: establishing a PAN connection with a computing device; and receiving from a STB, data indicative of a VOD content selection or other messages; sending such data to the computing device via the PAN connection to permit the computing device to communicate the data to a remote server via another network connection; and wherein the method steps are performed by a PAN transceiver unit in communication with the STB.

In another embodiment, a proxy method for enabling VOD purchases or other application messages, the method comprises: establishing a PAN connection with a PAN transceiver associated with a STB; receiving data indicative of a VOD content selection or other messages from the STB via the PAN and the PAN transceiver; sending data to a remote server via a WAN connection to thereby permit the remote server to process the data such as to determine whether a content subscription account associated with the STB is authorized for viewing the VOD content selection, the sent data comprising (1) data indicative of the VOD content selection, (2) data indicative of the content subscription account, and/or (3) other application messages; and wherein the method steps are performed by a computing device, the computing device comprising a member of the group consisting of (1) a smart phone, (2) a tablet computer, and/or (3) a mobile handheld computing device.

In another embodiment, a STB comprises: a PAN transceiver configured to send and receive wireless transmissions over a PAN connection, wherein the PAN transceiver is mounted outside the metal chassis but behind a plastic front bezel of the STB; memory configured to store first computer readable instructions for generating a VOD authorization request in response to a VOD selection from a user or other application messages, second computer-readable instructions for data transmission over the PAN connection, and third computer-readable instructions to play the VOD selection; a processor configured to: (1) execute the first computer-readable instructions to generate a VOD authorization request that includes data indicative of selected VOD content in response to a VOD selection from the user, (2) execute the second computer-readable instructions to (i) assemble data messages according to a PAN protocol and (ii) command the PAN transceiver to send the VOD authorization request, and (3) execute the third computer-readable instructions in response to a notification that the selected VOD content has been authorized.

In yet another embodiment, a method for enabling VOD purchases for an STB using a computing device as a proxy, the method comprises: establishing a PAN connection with a computing device; receiving data indicative of a VOD content selection or other application messages; sending data indicative of the VOD content selection or other application messages to the computing device via the PAN connection to permit the computing device to communicate the data to a remote server via another network connection; and wherein the method steps are performed by the STB.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings:

FIGS. 7(a) and 7(b) illustrate components and modules for an exemplary computing device.

DETAILED DESCRIPTION

Figure 1:
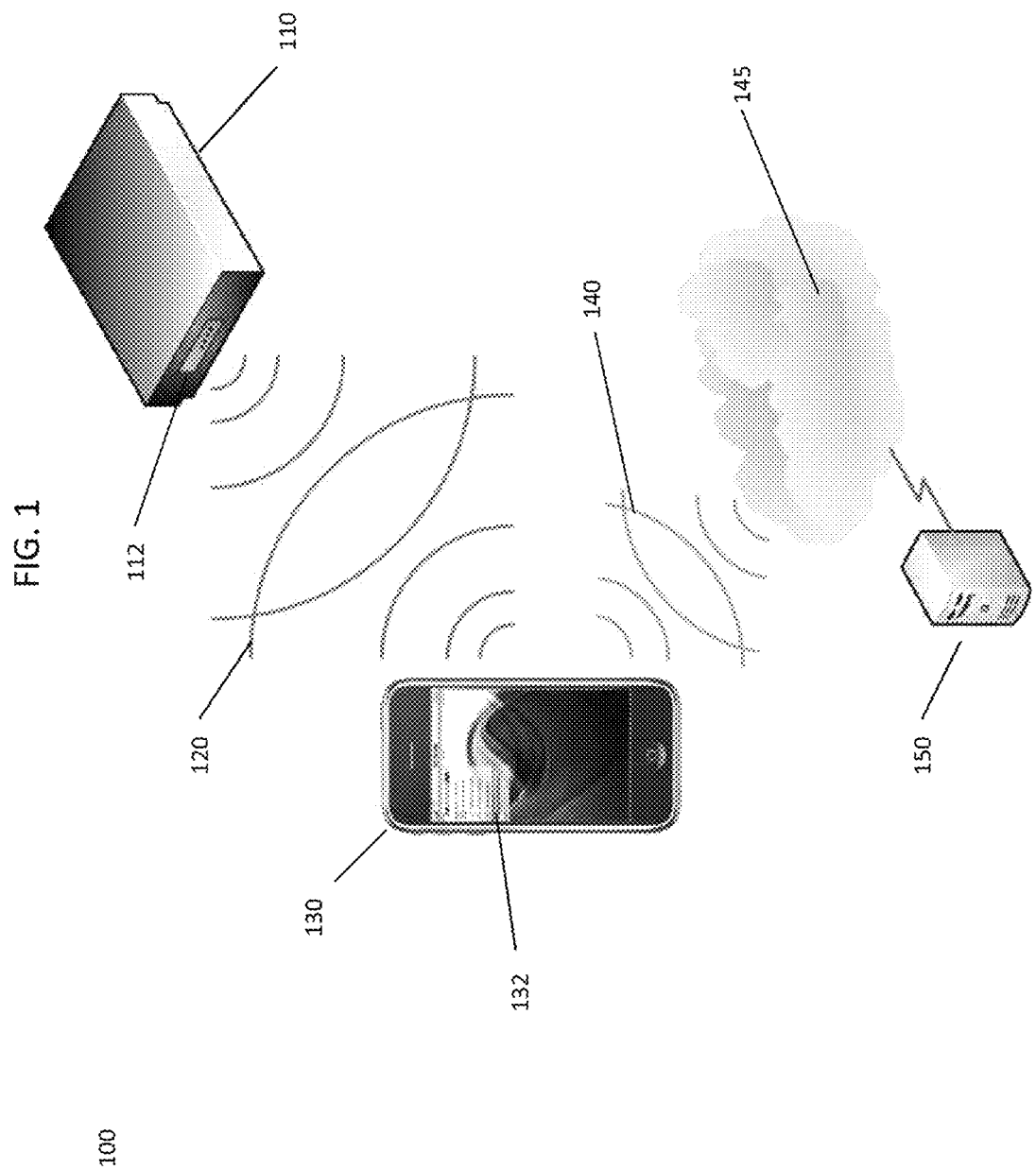
FIG. 1 illustrates a system diagram according to an exemplary embodiment.

Referring to the accompanying drawings in which like reference numbers indicate like elements, FIG. 1 illustrates a system diagram, including the three main devices involved in the PAN proxy system according to an exemplary embodiment. As shown in FIG. 1, the PAN proxy system 100 includes a set top box ("STB") 110, a computing device 130, and a VOD/application server 150. The computing device 130 connects to the STB 110 through a PAN connection 120, such as a Bluetooth or Bluetooth Low Energy (BLE) connection. The computing device 130 also connects to the server 150 through a WAN 140. The server 150 may be found using internet protocols, so the computing device 130 connects to the server 150 through the Internet 145.

The STB 110 may be a standard STB used for cable or satellite television, or the "STB" may be an application specific computing device such as an automobile computer system. For example, the STB 110 may include a processor, a motherboard, memory, a graphics unit for outputting video to a connected television, and a hard drive for storing VOD videos or programs recorded using a digital video recorder ("DVR"). The STB 110 may further include a sensor, such as an infrared sensor, for receiving commands made by a viewer through a remote control device. The sensor may also receive signals through other wireless communication means, such as Wi-Fi, Bluetooth, Zigsbee, or radio frequency. Further still, the STB 110 connects to a display device, such as a television or projector, to display audio/video content to the viewer. Any standard STB 110 may be used in the exemplary embodiments.

The STB 110 further comprises the PAN transceiver 112. The PAN transceiver 112 may alter the configuration of the STB 110 such that any typical, off-the-shelf STB may use the PAN communication protocol 120 and communicate with the computing device 130. In some embodiments, the STB 110 is manufactured to include the PAN transceiver 112, or the PAN transceiver may be added to the STB 110 subsequently to the STB's 110 manufacture. The PAN transceiver 112 may connect to the central processor of the STB 110 through a serial connection means, such as USB, Serial Peripheral Interface (SPI) bus, RS-232 or other flexible peripheral interconnection bus ("FPI"). The PAN transceiver 112 may receive power from the STB 110, and a power cable and the serial connection wires may be contained in the same ribbon cable. In one embodiment, the PAN transceiver 112 includes a Bluetooth transceiver and a processor. The processor can be configured to send and receive instructions to/from the STB 110 and send data transmission instructions to the Bluetooth transceiver. The Bluetooth transceiver can be configured to receive instructions from the processor, and send Bluetooth wireless data transmissions in response to the received instructions from the processor. The PAN transceiver 112 may further include status indicator lights forming a user interface.

While BLE communication has been described and will be primarily described below, any wireless communication protocol may be used for communicating data between the computing device 130 and the STB 110 by the exemplary embodiments. However, the inventors believe that BLE has a number of advantages. First, Bluetooth technology, especially Bluetooth low energy ("BLE") is already found in many computing devices. Also, personal area network protocols, like BLE, are private connections with a 30 foot range. Because carriers consider PANs private networks, forming a PAN does not cost a wireless subscriber any tethering fees. Further still, BLE transceivers can be manufactured for a relatively small amount of money. For example, a BLE transceiver according the exemplary embodiments can be manufactured for approximately $1-3, which may be one-tenth the cost of a GSM chip. Therefore, adding a BLE transceiver does not significantly affect the STB's 110 price to manufacture or purchase.

Preferably, the PAN transceiver 112 is mounted on the outside of the STB 110 metal chassis but behind the plastic front bezel to maximize the range of the PAN 120 as consumers are typically in front of the STB 110. PAN protocols, such as BLE, have relatively small ranges (e.g. 30-40 feet). If the PAN transceiver 112 was mounted within the STB 110, the metal frame of the STB 110 may create a Faraday shield and reduce the range of the PAN transceiver. In an effort to increase range, the PAN transceiver 112 is mounted on the front of the STB 110 metal chassis so that wireless signals are directed toward the user. The BLE transceiver may be mounted on the metal frame of the STB 110, but the PAN transceiver 112 may include a plastic cover that covers the BLE transceiver. The plastic cover may include LED status indicator lights, an LCD screen that displays operator instructions, or any other customized appearance for aesthetic purposes. In an effort to reduce costs for the PAN transceiver 112, the plastic cover may include minimal extra technology and aesthetic features.

The range of the BLE transceiver may be adjusted to avoid false positives, such as in the case where a person is directly above the STB 110, but on a different floor of a home. The BLE transceiver may be adjusted at any time. The BLE transceiver's range may be adjusted by varying the amount of power provided to the BLE transceiver by a power supply within the STB 110. Alternatively, the BLE communications can be focused or directed to a desired area via the use of directional antennas and/or shielding the antenna.

The PAN transceiver 112 includes its own processor to minimize system integration efforts with the STB 110 processor. Also, the processing unit within the PAN transceiver 112 may perform all wireless communication processing, and as such the STB's 110 processor does not have to perform substantially more processing as a result of adding the PAN transceiver 112. The PAN transceiver 112 may include a memory unit that includes software. Using the software, the processing unit can assemble/reassemble Bluetooth messages, create VOD request and/or application messages, and also include billing information.

The computing device 130 may be any computing device that has data access to the WAN 140. For example, the computing device 130 may be a smart cellular phone at least comprising a processor, a memory unit, a PAN transceiver (e.g. BLE) and a WAN transceiver (e.g. GSM/LTE, WiFi). The computing device 130 may also be a tablet computer, a laptop, and iPod (or similar device) or other portable or handheld computing device as long as it is capable of data communication with both a PAN and another network such as a WAN. Preferably, the computing device 130 has a touch screen interface. However, it should be understood that any of a variety of data display techniques and data input techniques could be employed by the computing device 130. For example, to receive inputs from a user, the computing device need not necessarily employ a touchscreen—it could also or alternatively employ a keyboard or other mechanisms such as voice capture-to-text translation. The WAN 140 may be any wireless data communication network, such as GSM (3G, 4G, LTE), Wi-Fi, other any other WAN wireless communication.

FIG. 7(a) depicts an exemplary embodiment for a computing device 130. The mobile device 130 may comprise a processor 700 and associated memory 702, where the processor 700 and memory 702 are configured to cooperate to execute software and/or firmware that supports operation of the computing device 130. Furthermore, the computing device 130 may include an I/O device 704 (e.g., a touchscreen user interface for graphically displaying output data and receiving input data from a user), optionally a camera 706, wireless I/O 708 for sending and receiving data, a microphone 710 for sensing sound and converting the sensed sound into an electrical signal for processing by the computing device 130, and a speaker 712 for converting sound data into audible sound. The wireless I/O 708 may include capabilities for making and taking telephone calls, communicating with nearby objects via near field communication (NFC), communicating with nearby objects via RF, and/or communicating with nearby objects via the PAN. These components are now resident in many standard models of smart phones and other mobile devices.

The computing device 130 may include an application 132 for execution by a processor of the computing device 130. The application 132 leverages the computing device's 130 communication resources, which include both WAN 140 and PAN 120, to offer proxy services without the cost of tethering services offered by a wireless carrier. The application 132 on the computing device 130 acts as a proxy to the STB 110 so that the STB 110 can send/receive messages, such as VOD authorization requests, to the VOD/application server 150.

The application 132 can send/receive data messages through the WAN 140, and the application 132 can further communicate locally with the STB 110 whenever the computing device 130 is within range of the STB 110 BLE transceiver 112 using the PAN 120.

FIG. 7(b) depicts an exemplary mobile application architecture 750 that can be used for app 132. App 132 with the architecture 750 of FIG. 7(b) can be installed on the computing device 130 for execution by processor 700. The mobile application architecture 750 preferably comprises a plurality of computer-executable instructions resident on a non-transitory computer-readable storage medium such as a computer memory. The instructions may include instructions defining a plurality of GUI screens for presentation to the user through the I/O device 704. The instructions may also include instructions defining various I/O programs 756 such as:

a GUI data out interface 758 for interfacing with the I/O device 704 to present one or more GUI screens 752 to the user;

a GUI data in interface 760 for interfacing with the I/O device 704 to receive user input data therefrom;

a wireless data out interface 766 for interfacing with the wireless I/O 708 to provide the wireless I/O with data for communication over the networks 120 and 140; and a wireless data in interface 768 for interfacing with the wireless I/O 708 to receive data communicated over the networks 120 and 140 to the portable computing device for processing by the mobile application 750.

The instructions may further include instructions defining a control program 754. The control program can be configured to provide the primary intelligence for the mobile application 750, including orchestrating the data outgoing to and incoming from the I/O programs 756 (e.g., determining which GUI screens 752 are to be presented to the user).

Whenever a VOD selection is made by the viewer, or an application message needs to be sent, the STB 110 sends a message through the PAN transceiver 112 to the computing device 130 over the PAN wireless connection 120. The PAN transceiver 112 performs segmentation of the STB 110 message. Segmentation divides the message into smaller sized messages for transmission over PAN. Upon receiving the smaller segmented messages, the application 132 reassembles the messages to the original STB message then prepares the message for transmission over the WAN 140 to the server 150. This preparation process may include extracting the message, removing PAN formatting/headers according to the PAN protocol data, and attaching necessary WAN 140 protocol parameters (e.g. TCP/IP headers/formatting) to the message. The message itself may include the content selection, a timestamp, a customer code, a satellite TV account number, and possibly billing formation. The message may or may not have to be translated by the application 132 into a format understood by the server 150. Preferably, the application 132 need not alter the data comprising the message from the STB 110, and simply prepares the data packets for transmission over the WAN 140 and the World Wide Web 145.

The server 150 may comprise one or more computers linked together. The server 150 may function like a web server and may be associated with a satellite company website or other application servers. To perform the tasks of a web server, the server 150 at least includes a network interface, one or more processors, and a computer-readable storage medium. The server 150 collects messages sent from customer computing devices 130, logs the messages, and generates authorization messages. The server 150 may send the authorization message to the STB 110 via a satellite, directly to STB 110 through an established connection, or through the WAN 140 and the PAN 120 using the computing device 130 as a proxy.

After the STB 110 receives an authorization message, the STB 110 begins playback of the selected content. Based on the transmission speed of the WAN 140, the amount of time necessary to send the authorization request and receive the authorization message should be relatively short because the amount of data sent over the WAN 140 should be a very small amount of data (on the scale or bytes or kilobytes). The server 150 may authenticate the VOD selection and request so that VOD selections and purchases can be tracked. The server 150 authenticates VOD selections and purchases according to a license agreement with the content producer, and the server 150 further tracks VOD selections. VOD logs created by the server 150 may be shared with content producers for billing, usage, and/or ratings purposes. When VOD content is not free, the server 150 may also process billing for the purchase, or the server 150 may send the VOD purchase data to another server that handles billing.

Before VOD purchases and requests can be made, the satellite provider may instruct the customer to do an initial device set-up. This device set-up or initialization phase needs to only be performed once per computing device 130. During the initialization phase, the computing device 130 and the STB 110 are paired. The first step of the initialization phase may involve the customer downloading the application 132 to his or her computing device 130, and user may complete the pairing process by using the application 132. The user may download the application 132 from an application store or by activating a hyperlink provided to the customer by the satellite provider through an email or text message.

As stated above, the application 132 may provide a guide or wizard that assists a user in pairing the computing device 130 and the STB 110 over the PAN 120. Once the PAN pairing process completes, the user enters their username and password to the service provider's online web account to permit the application 132 to login and attain secure user and account information providing a validation of the user and the computing device 130. The application 132 maintains a secure connection to the server 150 to transport usage, billing, and other application information. In the example of BLE, a user manually pairs the computing device 130 and the STB 110. After the initial pairing, the BLE module in the computing device 130 and the BLE module in the PAN transceiver 112 automatically reconnect whenever the computing device 130 enters the range of the STB 110. By using BLE, a viewer may not be aware that the computing device 130 is connected to the STB 110 over the PAN 120. The application 132 may perform pairing and reconnection in the background of the computing device 130 so that a user is not interrupted even while the user interacts with the computing device 130.

After pairing with the STB 110 during the initialization process, the application 132 may prompt the customer for information about the STB 110 and information about the customer. The application 132 may request account information from the customer, such as a username and password associated with their satellite TV subscription (such as the user name and password used to log into a satellite provider's billing website or the like). In the situation where the customer does not have a username and password set up with the satellite provider, the application 132 may register the customer as a new user by receiving account information (like an account number, billing address, social security number, etc.) and requesting that the customer choose a username and password. The application 132 may store the username and password on a computer-readable medium in the computing device 130 so that the customer does not need to enter the username and password every time they wish to view VOD content.

The application 132 may be able to download information associated with the customer using the user name and password from the server 150. For example, the server 150 may associate a plurality of data with the customer username, such as an account number, a billing address, a customer name, a subscription package, STB 110 serial numbers, STB 110 makes/models, or any other information the satellite company may store when activating the satellite service for the customer. In some situations, the server 150 may not have access to all of this information, and the customer may have to enter requested information through the application 132 when prompted. This data entry process is performed only once per computing device 130 to minimize customer inconvenience, and the computing device 130 or the server 150 stores the data entered by the customer on a computer-readable medium.

For security purposes, the application 132 may be the only way to pair a computing device 130 with the STB 110. The PAN 120 connection may also be encrypted for security purposes. Secure connections prevent an unauthorized user from making VOD purchases using the customer's STB 110 and billing information.

That said, the STB 110 may pair with multiple computing devices 130. For example, a family of five may share a satellite subscription. If each family member has a respective computing device 130, the STB 110 may pair with all five computing devices 130 so that each family member can watch VOD selections.

The application 132 may be configured to prevent some computing devices 130 from making VOD purchases that are age restricted. For example, if the youngest child in the family is a minor, the application 132 may prevent the youngest child from purchasing R-rated movies or watching TV-MA VOD programs. The application 132 may prevent a user from viewing age restricted material by simply not passing messages to the server 150 and displaying on the computing device 130 that the user is not authorized to make age restricted selections. The STB 110 may also display the age restricted warning on the television by receiving a message from the computing device 130 over the PAN 120 connection saying that the user may not view R-rated movies or TV-MA rated television programs.

Still during the initialization process, the application 132 may request demographic information about the user of the computing device, such as name, gender, age, ethnicity, location, favorite television shows or channels, etc. This information may be used for a television ratings embodiment, which is described in more detail below.

If more than one computing device 130 is within range, the STB 110 can use any of the computing devices 130 to request authorization for selected VOD content. The STB 110 may rank computing devices 130 in a preference (for example, "If 'Mom's' computing device 130 is within range, always use her computing device 130 for authorization"), or the STB 110 may simply use the computing device 130 that re-paired with the STB 110 most recently or least recently.

It should be noted that, even though the exemplary embodiments have been described to include an STB 110 and a PAN transceiver 112, some televisions, such as Smart TVs, may include a Bluetooth connection. If the TV is a Smart TV, and no cable box is required, the STB 110 and PAN transceiver 112 can be replaced by an application that is installed on the Smart TV.

The viewer may make VOD selections through an on-screen menu generated and displayed by the STB 110 on a television screen. VOD selections may also be made through the application 132. One of the application 132 features may be a remote control feature, where the user may view VOD content, view a channel guide on their computing device 130, and control the STB 110 using the computing device 130. To provide such a remote feature on the computing device 130, the PAN transceiver 112 may further include software the receives the selection messages or remote control-type messages from the computing device 130, translates the messages into a format understood by the STB 110, and sends the messages to the STB 110 main processor so that the processor tunes to the correct channel or begins playback of the VOD selection.

Figure 6:
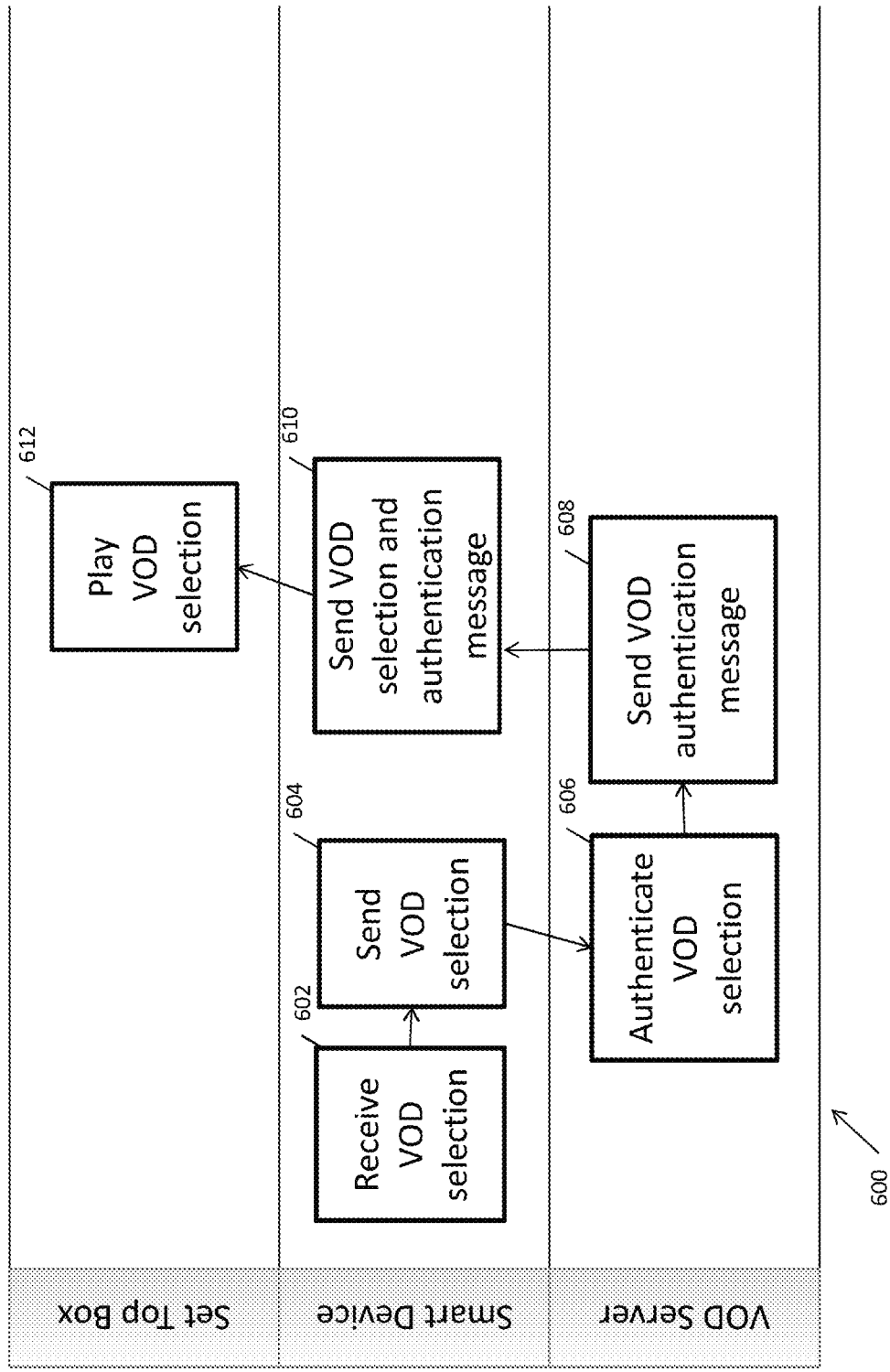
FIG. 6 illustrates a method for authenticating VOD selections when VOD selections are made through a remote feature on a computing device according to an exemplary embodiment.

If a user makes a VOD selection on the computing device 130, the application 132 may directly send the VOD content authorization request to the server 150. A method 600 for making VOD selections through the application 132 is shown in FIG. 6. The method 600 begins in step 602 when the application 132 receives a VOD selection from a user through a user interface generated by the application 132. Next, the computing device 130 sends the VOD selection directly to the server 150 for authentication of the VOD selection in step 604. The computing device 130 sends a VOD selection message over the WAN 140. After the server 150 receives the VOD request message, the server 150 authenticates the VOD request in step 606. The server 150 may then send an authenticated message to the computing device 130 over the WAN 140 in step 608. After the computing device 130 receives the authentication message, the computing device 130 sends the VOD selection and the authentication message to the STB 110 over the PAN 120 in step 610. After the STB 110 receives the VOD selection and the authentication message, the STB plays the VOD selection in step 612.

The authentication message to the STB 110 may only be sent by the application 132 to the STB 110 after the application 1320 has received an authentication message from the server 150. Alternatively, the STB 110 may receive VOD content from the server 150 after the VOD selection made through the application 132 has been authenticated.

Figure 2:
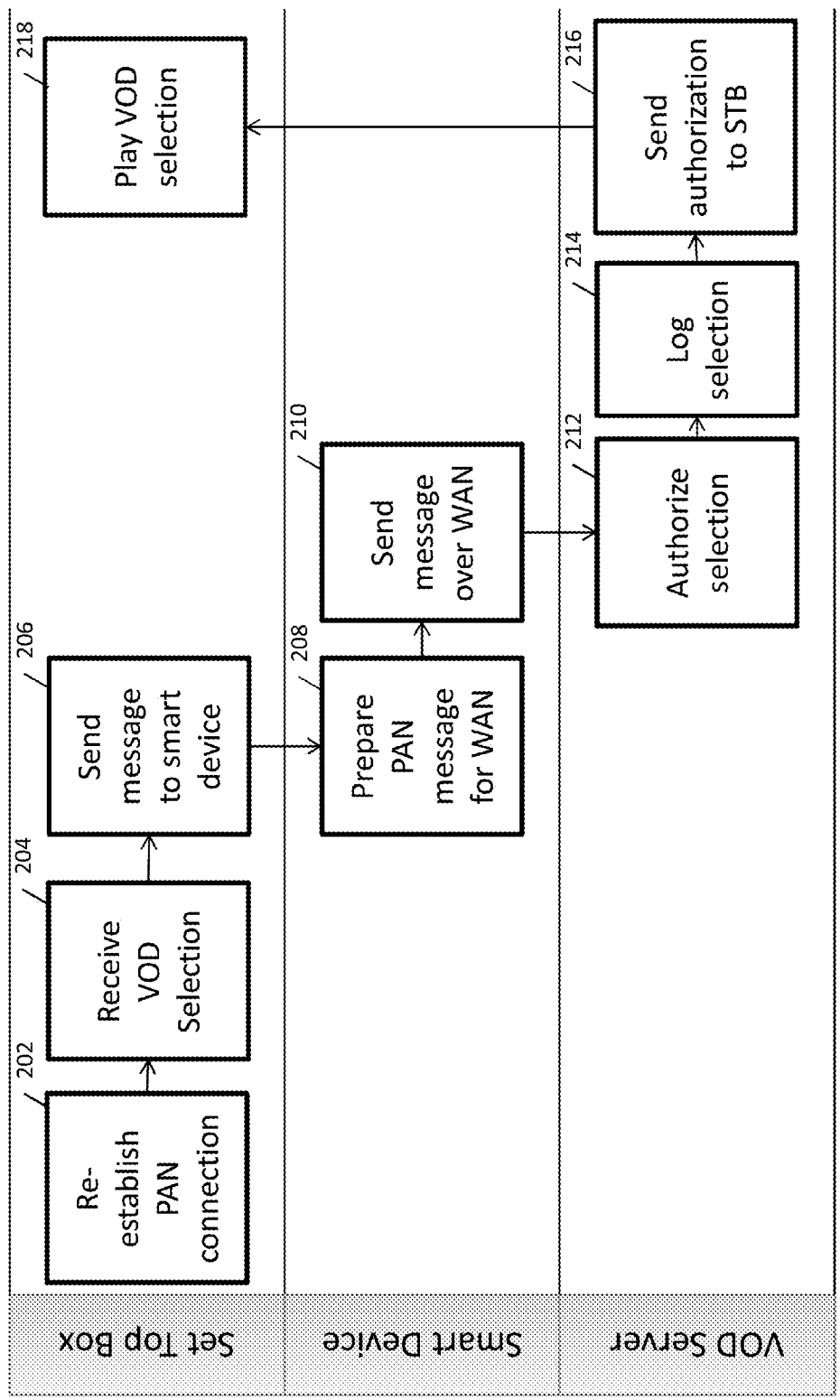
FIG. 2 illustrates a method for using a personal area network to authorize video on demand purchases according to an exemplary embodiment.

Referring now to FIG. 2, a method 200 for authorizing VOD content using the system of FIG. 1 is illustrated. The method 200 uses three separate devices: the STB 110, the computing device 130, and the server 150. FIG. 2 illustrates which device performs each step of the method 200.

The method 200 begins in step 202 when the computing device 130 and the STB 110 establish a PAN 120 connection. If this is the first time the computing device 130 and the STB 110 have connected, the viewer may need to perform the steps comprising the initialization process. Normally, re-establishing the PAN connection is automatically performed by the PAN transceiver 112 and the computing device 130 whenever the computing device 130 enters the range of the PAN transceiver 112.

Subsequently, the method 200 continues in step 204 when the STB 110 receives a VOD selection from the viewer. The STB 110 may receive this selection from a standard infrared remote or through the remote feature of the application 132 described above. For the following example, it will be assumed that the STB 110 received the VOD selection from an infrared remote control signal.

After the viewer makes a VOD selection, the STB 110 sends a message to the computing device 130 requesting that the computing device 130 relay the message to the server 150 over its WAN 140 connection. This message requests authorization to play the VOD selection on the STB 110. The message may include information about the selected content, information about the viewer, information about the STB 110, a timestamp, or any other information used by the server 150 to authorize a VOD purchase or selection. The message is sent by the STB 110 using the PAN transceiver 112 over the PAN 120 connection (e.g. Bluetooth) with the computing device 130.

The computing device 130 receives the PAN message from the STB 110, and using software instructions defined by the application 132, a processor within the computing device 130 alters the PAN message into a message that can be sent over the WAN 140 in step 208. This alteration may involve reassembling the message based on the BLE protocol and assembling data packets according to TCP/IP protocol. In general, TCP/IP protocol involves generating data packets that comprise the message from the STB 110, adding an internet address, and any other necessary steps required to send a message over the WAN 140.

In step 210, the computing device 130 sends the message over the WAN 140 according to the WAN 140 transmission protocols (e.g. TCP/IP). The application 132 stores an Internet address for the server 150 so that messages can be sent to the server 150 over the WAN 140. A TCP/IP protocol stack for the computing device 130 may handle some or all of the data transmission procedures.

In step 212, the server 150 receives the message from the computing device 130 and authorizes the purchase or selection in step 212. This authorization process may involve determining whether the viewer has paid for the content he wishes to watch (e.g. a person who does not have an HBO subscription cannot watch an HBO program on demand without an HBO subscription). This process may further involve requesting a license from the content producer. If the program is a rental or a pay-per-view type purchase, the authorization process may involve billing the viewer's account. If the person has paid for the subscription and requested an eligible program, the server 150 authorizes the selection. After authorizing the server 150 logs the selection in step 214. Logging may be used to track user viewing habits or for billing purposes.

After the request is authorized, the server 150 sends a message to the STB 110 through any capable data communication means in step 216. For example, the server 150 can send an authorized message directly to the STB 110, through the computing device 130 over the WAN 140 and the PAN 120, or through the satellite that provides the satellite feed.

Finally, the STB 110 receives the authorization message from the server 150 and begins playback of the VOD content selection made by the viewer in step 218.

As can be seen by the system and method described in FIGS. 1 and 2, VOD selections and purchases can be made even with a satellite subscription and without a broadband internet connection. The solution illustrated in FIGS. 1 and 2 requires no additional wireless subscriptions, minimal user effort, and minimal additional equipment costs.

Figure 3:
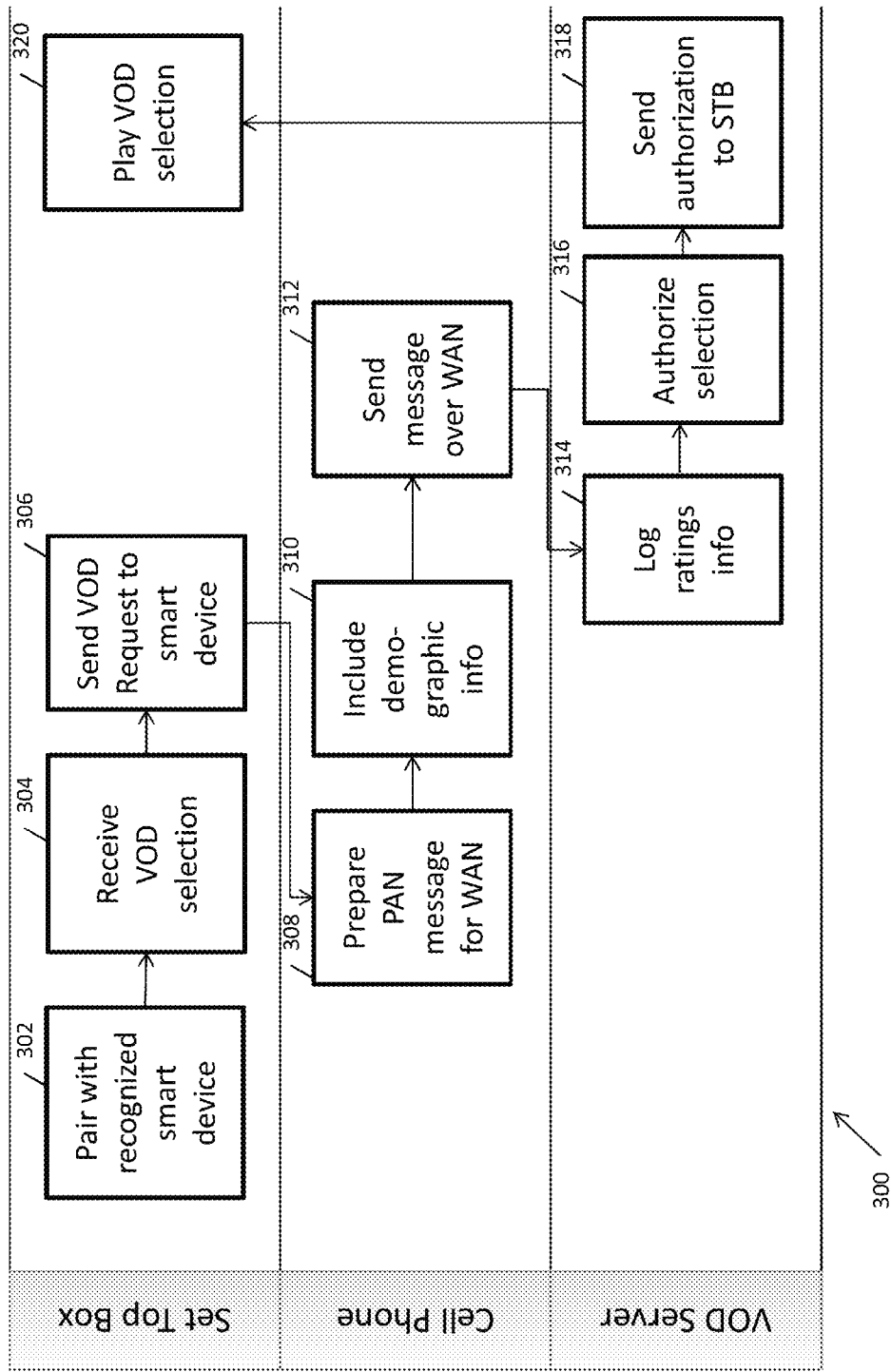
FIG. 3 illustrates a method for generating ratings information using a personal area network according to an exemplary embodiment.
Figure 4:
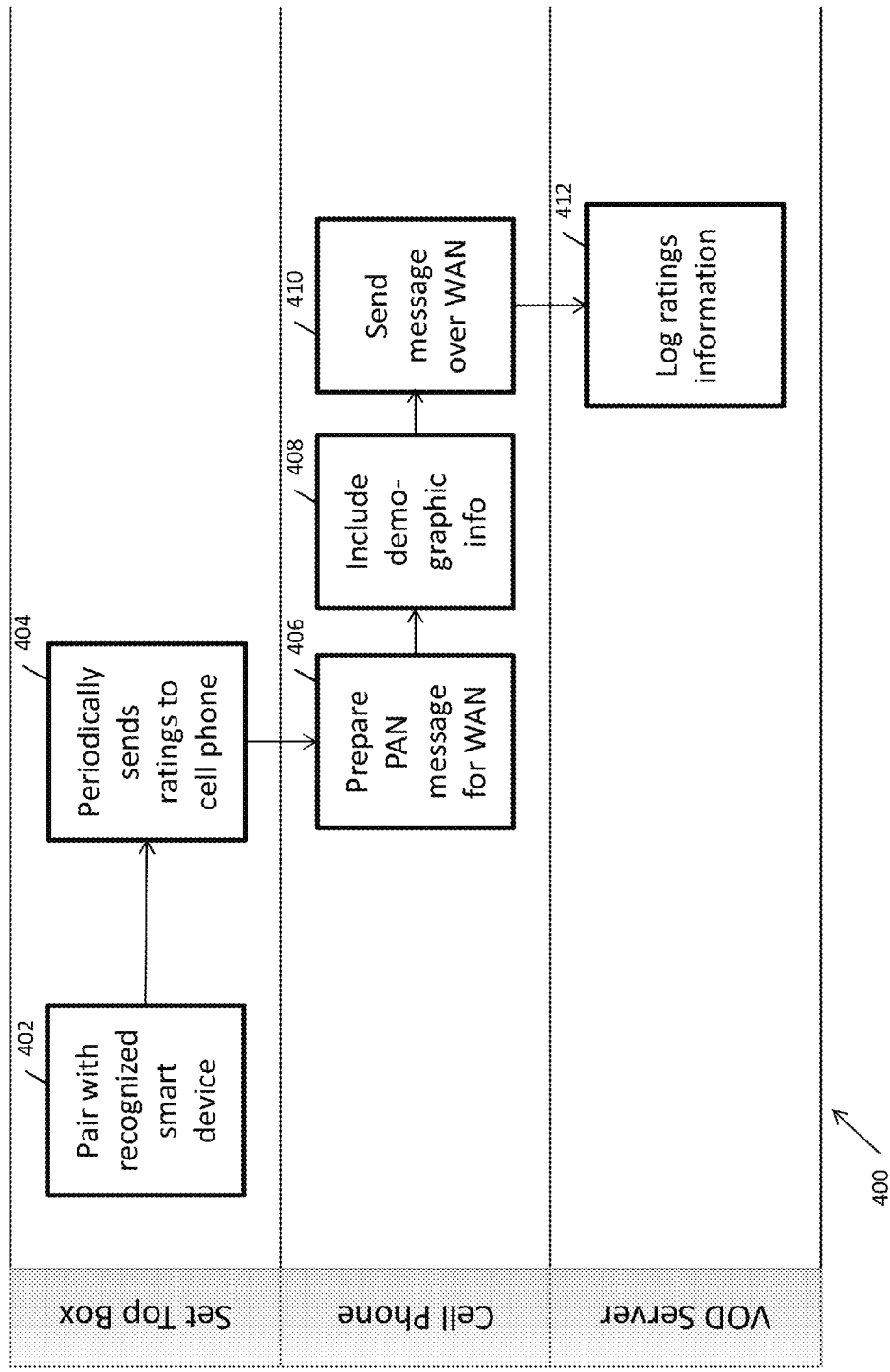
FIG. 4 illustrates another method for generating ratings information using a personal area network according to an exemplary embodiment.

Referring now to FIGS. 3 and 4, a method 300 and a method 400 for gathering demographic information and generating ratings information for VOD or live television programs is illustrated. As described above, the initialization process not only pairs a computing device 130 to the STB 110, but the initialization process may also gather demographic information about a customer. In general, the computing device 130 is associated with only one user of the computing device 130. In a family of five, it is entirely reasonable to assume that each member of the family has their own computing device 130. Generally people carry computing devices 130 with them just about everywhere, so whenever someone enters the room to watch TV, it is safe to assume that the computing device 130 also enters the room. Based on this assumption, the STB 110 and the computing devices 130 in range of the STB 110 can send information about what television programs are being watched by each member of the family.

Information for generating ratings can be performed in either a VOD example or a live streaming television example. Starting with the VOD example, the method 300 begins in step 302 where the STB 110 re-establishes a connection with a paired computing device 130. If this is the first time the computing device 130 and the STB 110 have connected, the viewer may need to perform the steps comprising the initialization process. Normally, re-establishing the PAN 120 connection is automatically performed whenever the computing device enters the range of the PAN transceiver 112.

Subsequently, the method 300 continues in step 304 when the STB 110 receives a VOD selection from the viewer. The STB 110 may receive this selection from a standard infrared remote or through the remote feature of the application 132. As described above, this selection may be received by the application 132 through the remote feature of the application 132 and not the STB 110. For the following method, it will be assumed that the STB 110 received the VOD selection. If the selection is made through the application 132, step 304 is performed by the computing device 130, and steps 306 and 308 may be omitted.

After the viewer makes a VOD selection, the STB 110 sends a message to the computing device 130 requesting the computing device to send the message to the server 150 over its WAN 140 connection in step 306. This message requests authorization to play the VOD selection on the STB 110. The message is sent by the STB 110 using the PAN transceiver 112 over the PAN 120 connection. For example, the PAN 120 connection is BLE.

The computing device 130 receives the PAN signal from the STB 110, and using the software instructions defined by the application 130, a processor within the computing device 130 changes the PAN message into a message that can be sent over the WAN 140 in step 308. This may involve TCP/IP protocol, generating data packets that comprise the message from the STB 110, and any other necessary steps required to send a message over the WAN 140.

Further, in the method 300, the application 132 attaches demographic information about the user of the computing device 130 in step 310. This information may be general or very specific. For example, the demographic information may only include an age range (e.g. 18-25), a gender, and a location, or the information may include the actual name of the customer, the customer's actual age, the customer's gender, or any other user-specific information. This information is included in the VOD request for authorization so that VOD server can track the demographics for all the people who selected this particular VOD content selection. The application 132 stores the demographic information about the user, and the application 132 retrieves the demographic information from some computer-readable medium before sending the VOD authorization request.

In step 312, the computing device 130 sends the message over the WAN 140 according to the WAN transmission protocols (e.g. TCP/IP). The application 132 stores an Internet address for the server 150 so that messages can be sent to the server 150 over the WAN 140 and the World Wide Web 145.

In step 314, the server 150 receives the message from the computing device 130 and logs the demographic information in step 314. The stored demographic information is associated with the content selection made by the user. The stored demographic information that is associated with a particular content selection allows the server 150 to calculate the ratings for the content selection over a given amount of time. For example, hypothetical television show "Breaking Sad" may be watched by 1000 VOD viewers over the first week of September. This rating information may be very valuable to advertisers considering advertising during subsequent episodes of "Breaking Sad" and also to producers of the show.

After logging demographic information or concurrently with the logging process, the server 150 authorizes the purchase or selection in step 316. This authorization process may involve determining whether the viewer has paid for the content he wishes to watch. This process may further involve requesting a license form the content producer. If the person has paid for the subscription and requested an eligible program, the server 150 authorizes the selection.

After the request is authorized, the server 150 sends a message to the STB 110 through any means in step 318. For example, the server 150 can send an authorized message directly to the STB 110, over the WAN 140 and the PAN 120 using the computing device 130 as a proxy, or through the satellite that provides the satellite feed.

Finally, the STB 110 receives the authorized message from the server 150 and begins playback of the content selection made by the viewer in step 320.

Referring now to FIG. 4, a method 400 for collecting demographic information during live television is illustrated. The method 400 begins at step 402 where the STB 110 re-establishes a connection with a paired computing device 130. If this is the first time the computing device 130 and the STB 110 have connected, the viewer may need to perform the steps comprising the initialization process. Normally, re-establishing the PAN 120 connection is automatically performed whenever the computing device enters the range of the PAN transceiver 112.

While the viewer interacts with the STB 110 while watching live television, the STB 110 may periodically send a message to the computing device 130 that 1) instructs the computing device to send a message to the server 150 with demographic information, and 2) includes television content that the user is viewing in step 404.

Because viewing patterns can be random, and viewers often switch channels, the periodic nature of the message sending may not be constant. For example, the STB 110 could send a message to the computing device 130 at the end of every period (e.g. every 10 minutes). However, this strictly periodic method may not be the best method for tracking viewing patterns. Viewers often flip channels and programs, so it is possible that a message gets sent to the server 150 indicating a channel that the viewer was not actually watching, but merely a channel or show the viewer was tuned to at the end of a reporting period while flipping channels.

Alternatively, the STB 110 may monitor channel changes. For example, the STB 110 may send a message to the computing device 130 requesting that the computing device 130 send a message to the server 150 indicating which channel the viewer is watching after the viewer remains watching one channel or show for a designated period. For example, if a user remains watching one channel for five or ten minutes without flipping channels, the STB 110 may request that the computing device 130 send a viewing habits message. Using this method, the STB 110 can be relatively confident that the viewer is actually watching the channel or show, and not merely searching for a program to watch.

The STB 110 may also monitor changes in programming by referencing a programming guide. Often viewers will navigate to a channel before a program begins with no real interest in the show playing before the desired program begins (e.g. tune to channel 6 at 8:56 anticipating the 9 PM show). So, if a user navigates to a channel, but the program is about the change in the next few minutes, the STB 110 may wait until the next program begins before starting a clock that determines when to send a viewing habits message. The STB 110 may monitor programming schedules using a content guide. If the viewer remains on the same channel for five or ten minutes after a new show begins, the STB 110 can safely assume the viewer is watching this program, and the STB 110 sends a message to the computing device 130 so that the computing device can relay the information to the server 150.

The viewing habits message sent by the STB 110 may include the program and channel watched by the viewer. The STB 110 may request that all computing devices 130 within range of the STB 110 send the ratings message. The STB 110 may need to track how long each computing device 130 within range has been within range. For example, a first computing device 130 may be within range of the STB 110 for twenty minutes, but a second device may only have been within range of the STB 110 for one minute. So, the first computing device 130 may be ready to send a viewing habits message, but the second computing device 130 has not been within range of the STB 110 for long enough.

Whenever the computing device 130 receives a message from the STB 110 indicating the show being watched, the computing device 130 uses the software instructions defined by the application 132, and a processor within the computing device 130 changes the PAN message into a message that can be sent over the WAN 140 in step 406. This may involve reassembling the message based on the PAN protocol, generating data packets that comprise the message based on TCP/IP protocol, and any other necessary steps required to send a message over the WAN 140.

Further, in the method 400, the application 132 attaches demographic information about the user of the computing device 130 in step 408. In step 410, the computing device 130 sends the message over the WAN 140 according to the WAN transmission protocols (e.g. TCP/IP). The application 132 stores an internet address for the server 150 so that messages can be sent to the server 150 over the WAN 140.

In step 412, the server 150 receives the message from the computing device 130 and logs the demographic information and the content/channel data in step 314. The stored demographic information is associated with the content being watched by the user. The stored demographic information that is associated with a particular content allows the server 150 to calculate the ratings for the content. For example, the server 150 can determine how many subscribers watched a program when the program aired.

Through the ratings calculation methods of FIGS. 3 and 4, a cable or satellite provider could generate meaningful ratings information that is more specific than traditional Nielsen ratings. The ratings are more specific in terms of when the person began watching, who was watching, and what shows they watched. In addition, this ratings information is more valuable because a cable or satellite provider likely has more subscribers than the number of viewers participating in a typical Nielsen survey, so the ratings information is more accurate and a better representation of a population's viewing habits than a small Nielsen survey. Information of this type may be very valuable to content producers and advertisers.

The system illustrated in FIG. 1 can also benefit the customer when the customer has problems with their cable or satellite service or hardware. Generally, when a customer has a problem, the customer calls tech support and tries to debug the problem at the direction of the tech support representative. While the customer can describe the problem, the process can still be frustrating for both parties because the tech support representative cannot actually see the problems occurring on the customer's end.

Using the system shown in FIG. 1, a tech support representative can connect directly to the STB 110 and debug the problem directly. Much like how screen sharing has helped tech support representatives quickly debug computer problems, the system of FIG. 1 allows tech support representatives to debug cable and satellite STB problems remotely. According to the system shown in FIG. 1, the tech support representative can connect to the STB 110 using the customer's computing device 130 as a relay to find and fix problems in the hardware, firmware, or software of the STB 110.

Figure 5:
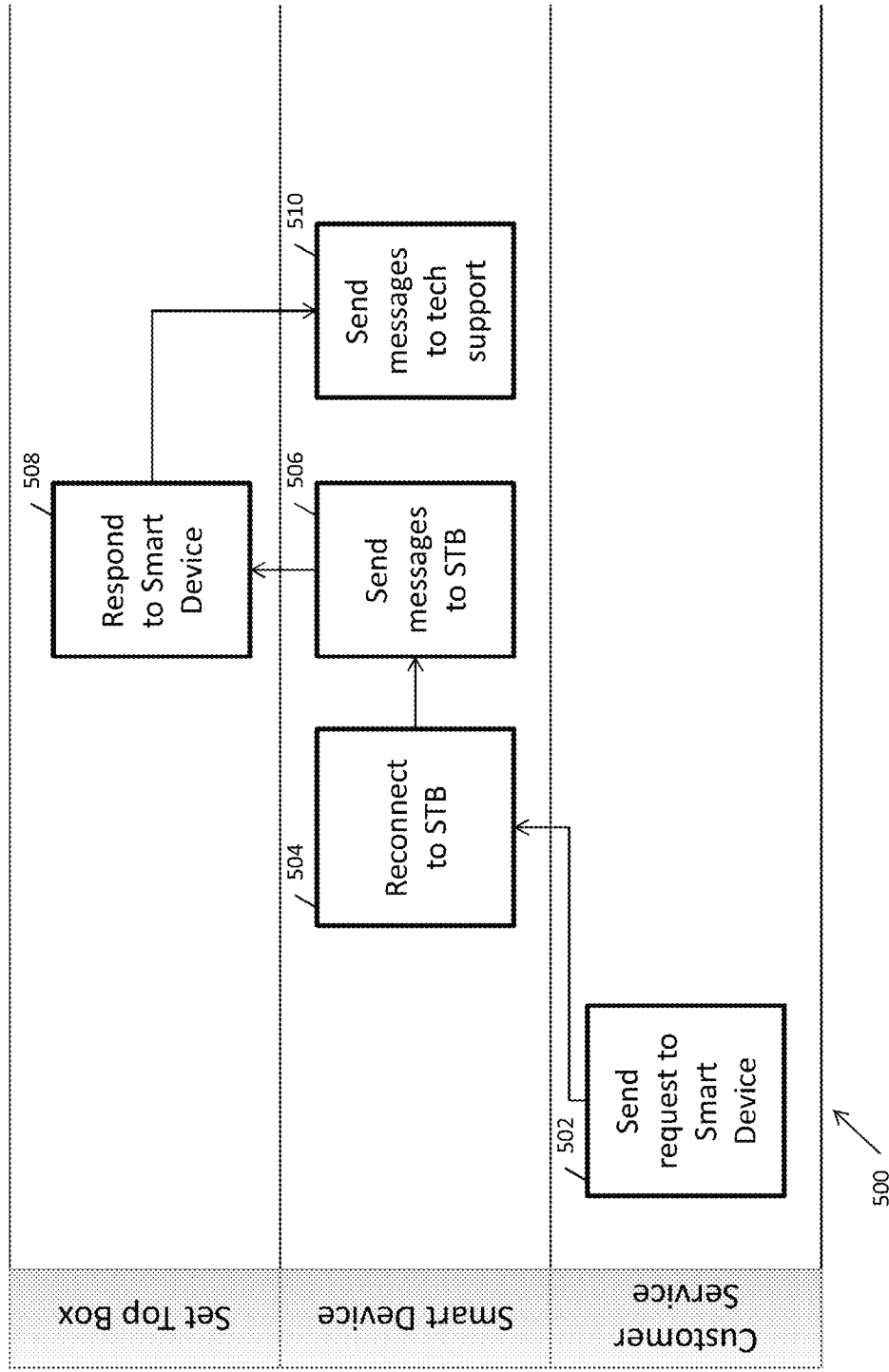
FIG. 5 illustrates a method for configuring a set top box remotely through a personal area network connection between a computing device and the set top box according to an exemplary embodiment.

Referring to FIG. 5, a method 500 for connecting a tech support representative to a customer's STB 110 using the customer's computing device 130 and application 132 as a proxy is illustrated. When a customer calls a cable or satellite provider's tech support department, the tech support representative will request to connect to the STB 110 and see if he or she can diagnose the problem. Upon the customer's consent, the tech support representative's computer sends a message to the customer's computing device 130 requesting access to the STB 110 in step 502. The customer can accept the tech support representative's access through the application 132.

The computing device 130 can connect or reconnect to the STB 110 through the PAN 120 in step 504. In many cases, the computing device 130 may already be connected to the STB 110. Assuming the computing device 130 has connected to the STB 110 through the PAN 120 previously, the customer only has to bring the computing device 130 into the range of the STB 110 for a reconnection process to happen automatically.

Once connected, the computing device 130 can relay messages to the STB 110 at the behest of the tech support representative in step 506. The STB 110 may respond with error messages, warnings, or status messages indicating the current status of the STB 110 in response to the messages relayed through the computing device 130 in step 508. The computing device 130 can relay those status messages from the STB 110 to the tech support representative's computer in step 510. This process may involve reassembling messages according to the PAN 120 protocol, and generating data packets according to the WAN 140 protocol. Using the status messages, the tech support representative can diagnose the problem and hopefully fix the problem by sending update messages, messages that reset the STB 110, or any other debugging commands. In this way, the computing device 130 acts as a relay between the STB 110 and the tech support representative's computer so that the customer does not need to perform any problem solving or debugging actions.

By using the system illustrated in FIG. 1 and the method illustrated in FIG. 5, customer problems with their cable or satellite STB 110 can be diagnosed and fixed remotely by a tech support representative. Such a remote access problem solving tool provides the customer with additional convenience and likely fixes problem faster than conventional tech support solutions.

It should be noted that this WAN and PAN connection proxy is not limited to cable and satellite television applications. For example, using a computing device's PAN and WAN connections, a vehicle could connect to the WAN. Many modern vehicles now have BLE hardware so that drivers can stream music or other audio streams through their computing device over the Bluetooth wireless connection. By leveraging this BLE connection between a vehicle and a computing device, the vehicle be can communicate with other digital devices. For example, driving habits or maintenance requests may be sent to a server from the car.

For example, a car could send a message to a dealership notifying the dealer that the vehicle needs an oil change, and the dealership could respond with an oil change coupon message to the driver of the vehicle. Such a coupon not only reminds the driver that the vehicle needs an oil change, but hopefully the coupon saves the driver money on maintenance costs. In another example, the vehicle could report if it has been in an accident through the computing device. As can be seen by the vehicle example, combining the benefits of PAN and WAN connections that a computing device is able to utilize provides benefits in many different industries, including vehicles and satellite television.

In view of the foregoing, it will be seen that the several advantages of the invention are achieved and attained.

The exemplary embodiments can include one or more computer programs that embody the functions described herein and illustrated in the appended flow charts. However, it should be apparent that there could be many different ways of implementing aspects of the exemplary embodiments in computer programming, and these aspects should not be construed as limited to one set of computer instructions. Further, those skilled in the art will appreciate that one or more acts described herein may be performed by hardware, software, or a combination thereof, as may be embodied in one or more computing systems.

The functionality described herein can be implemented by numerous modules or components that can perform one or multiple functions. Each module or component can be executed by a computer, such as a server, having a non-transitory computer-readable medium and processor. In one alternative, multiple computers may be necessary to implement the functionality of one module or component.

Unless specifically stated otherwise as apparent from the following discussion, it is appreciated that throughout the description, discussions utilizing terms such as "receiving" or "establishing" or "connecting" or "sending" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The exemplary embodiments can relate to an apparatus for performing one or more of the functions described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A system for authorizing video on demand ("VOD") purchases comprising:
a set top box ("STB") comprising a serial connector;
a personal area network ("PAN") transceiver unit comprising a PAN transceiver, a processor, and a serial connector;
a portable computer comprising a processor, a memory, a PAN transceiver, and a wide area network ("WAN") transceiver, the portable computer including a mobile application that is embodied as a plurality of processor-executable instructions resident in the portable computer's memory; and
a server;
wherein the PAN transceiver unit is configured to connect with the STB's serial connector via the PAN transceiver unit's serial connector;
wherein the portable computer's processor is further configured to execute the mobile application to create a proxy service through which there is a PAN communication path between the STB and the mobile application via a wireless PAN that is established between the PAN transceivers of the PAN transceiver unit and the portable computer and through which there is a WAN communication path between the mobile application and the server via the portable computer's WAN transceiver, wherein the proxy service leverages an existing data service plan from a carrier for the portable computer and does not leverage a tethering plan from the carrier for the portable computer;
wherein the STB is configured to (1) receive data representative of a selection of VOD content by a user, (2) generate a VOD authorization request corresponding to the VOD content selection in response to the received data, (3) output the VOD authorization request to the PAN transceiver unit through the STB's serial connector, and (4) play the VOD content in response to receipt of an authorization message;
wherein the PAN transceiver unit's processor is configured to (1) receive the VOD authorization request from the STB via the PAN transceiver unit's serial connector, and (2) send the VOD authorization request to the portable computer via the STB transceiver unit's PAN transceiver and the wireless PAN according to a PAN protocol;
wherein the portable computer is configured to, through the proxy service created by execution of the mobile application, (1) receive the VOD authorization request sent by the PAN transceiver unit and (2) send the VOD authorization request to the server via the WAN communication path according to a WAN protocol; and
wherein the server is configured to (1) receive the VOD authorization request sent by the portable computer, (2) generate an authorization message based on the received VOD authorization request, and (3) send the authorization message to the STB.

2. The system of claim 1, wherein the system further comprises an infrared ("IR") remote distinct from the portable computer, wherein the IR remote is configured to transmit the VOD content selection to the STB via IR.

3. The system of claim 1, wherein the execution of the mobile application is further configured to, via the proxy service created by the mobile application, (1) receive the authorization message from the server via the WAN communication path, and (2) relay the authorization message to the STB over the wireless PAN.

4. The system of claim 1, wherein the portable computer's PAN transceiver and the PAN transceiver unit's PAN transceiver are configured to communicate with each other via Bluetooth BLE.

5. The system of claim 4, wherein the execution of the mobile application is further configured to, via the proxy service created by the mobile application, reassemble the VOD authorization request according to the Bluetooth communication protocol.

6. The system of claim 5, wherein the execution of the mobile application is further configured to, via the proxy service created by the mobile application, send the VOD authorization request to the server according to TCP/IP.

7. The system of claim 1, wherein the STB is further configured to communicate channel changes to the PAN transceiver unit;
wherein the PAN transceiver unit is further configured to send a message with data indicative of the channel changes to the portable computer via the proxy service; and
wherein the execution of the mobile application is further configured to relay the channel change data to the server via the WAN communication path according to a WAN protocol; and
wherein the server is further configured to store ratings data in a database based on the channel change data sent by the portable computer.

8. The system of claim 1, wherein the server is further configured to initiate a technical support operation with the STB via the portable computer, wherein as part of the technical support operation, the server is further configured to send a technical support request that is destined for the STB to the portable computer via the WAN communication path;
wherein execution of the mobile application is further configured to, via the proxy service created by the mobile application, relay the technical support request to the PAN transceiver unit via the PAN communication path;
wherein the PAN transceiver unit is further configured to relay the technical support request to the STB;
wherein the STB is further configured to generate a response to the technical support request and communicate the response to the PAN transceiver unit;
wherein the PAN transceiver unit is further configured to relay the response to the portable computer via the PAN communication path;
wherein execution of the mobile application is further configured to, via the proxy service created by the mobile application, send the response to the server via the WAN communication path.

9. The system of claim 1, wherein the STB is further configured to receive the authorization message through a satellite dish connected to the STB.

10. A method for authorizing video on demand ("VOD") purchases comprising:
a mobile application executed by a portable computer creating a proxy service when the portable computer and a personal area network ("PAN") transceiver unit are within a PAN range of each other, wherein the created proxy service wirelessly connects the PAN transceiver unit with the mobile application via a PAN and wirelessly connects the mobile application with a remote server via a wide area network ("WAN"), and wherein the proxy service leverages an existing data service plan from a carrier for the portable computer and does not leverage a tethering plan from the carrier for the portable computer;
receiving, by a set top box ("STB"), a selection of VOD content from a viewer, the STB including a serial connector through which the STB is connected with the PAN transceiver unit;
the STB communicating an authorization request corresponding to the VOD content selection to the PAN transceiver unit via the serial connection;
the PAN transceiver unit sending the authorization request to the portable computer over the PAN;
the mobile application, via the created proxy service, sending, the authorization request over the WAN to the remote server; and
beginning playback, by the STB, of the VOD content selection after the remote server authenticates the VOD content selection.

11. A computer program product comprising:
a plurality of processor-executable instructions that embody a mobile application for execution by a portable computer, the instructions being resident on a non-transitory computer-readable storage medium and being configured, upon execution by a processor of the portable computer, to:
create a proxy service through which a wireless personal area network ("PAN") is established to pair the portable computer with a set top box ("STB") via a PAN connection and through which a wide area network ("WAN") connection is established between the mobile application and a remote server, wherein the proxy service leverages an existing data service plan from a carrier for the portable computer and does not leverage a tethering plan from the carrier for the portable computer;
receive a plurality of segments of a message from the STB through the proxy service over the PAN connection;
reassemble the message from the received message segments according a PAN protocol;
prepare the message for transmission over the WAN connection according to a WAN protocol; and
send the prepared message to the remote server through the proxy service over the WAN connection according to the WAN protocol.

12. The computer program product of claim 11, wherein the PAN connection comprises a Bluetooth connection.

13. The computer program product of claim 11, wherein the WAN protocol comprises TCP/IP.

14. The computer program product of claim 11, wherein the instructions are further configured, upon execution by the processor of the portable computer, to:
retrieve information indicative of a user associated with the portable computer from memory on the portable computer; and
augment the prepared message with the retrieved information such that the prepared message sent to the remote server over the WAN connection includes the retrieved information.

15. The computer program product of claim 11, wherein the instructions are further configured, upon execution by the processor of the portable computer, to pair the portable computer with the STB via the wireless PAN automatically when the portable computer comes within a PAN range of the second device.

16. An apparatus comprising:
a wide area network ("WAN") transceiver configured to send and receive data over a WAN connection;
a personal area network ("PAN") transceiver configured to communicate with a set top box ("STB") over a PAN connection;
a memory configured to store a plurality of processor-executable instructions that embody a mobile application; and
a processor in cooperation with the memory, wherein the processor configured to execute the mobile application;
wherein the PAN transceiver, the WAN transceiver, the memory, and the processor are resident on a member of the group consisting of (1) a smart phone, (2) a tablet computer, and (3) a mobile handheld computing device;
wherein execution of the mobile application causes the processor to:
create a proxy service through which the mobile application communicates with the STB via the PAN transceiver and the PAN connection and through which the mobile application communicates with a remote server via the WAN transceiver and the WAN connection, wherein the proxy service leverages an existing data service plan from a carrier for the member and does not leverage a tethering plan from the carrier for the member;
receive a plurality of segments of a message from the STB through the proxy service over the PAN connection;
reassemble the message from the received message segments according a PAN protocol;
prepare the message for transmission over the WAN connection according to a WAN protocol; and
send the prepared message to the remote server through the proxy service over the WAN connection according to the WAN protocol.

17. The apparatus of claim 16, wherein the PAN transceiver comprises a Bluetooth transceiver.

18. The apparatus of claim 16, wherein the WAN transceiver comprises a cellular transceiver.

19. A proxy method comprising:
a processor executing a mobile application, wherein the processor is resident on a member of the group consisting of (1) a smart phone, (2) a tablet computer, and (3) a mobile handheld computing device;
wherein the executing step comprises:
creating a proxy service through which the mobile application, wherein the creating step includes forming a personal area network ("PAN") with a set top box ("STB") via a PAN transceiver and forming a wide area network ("WAN") with a remote server via a WAN transceiver such that the mobile application communicates with the STB through the proxy service via the PAN transceiver and the PAN communicates with the remote server via the WAN transceiver and the WAN connection, wherein the proxy service leverages an existing data service plan from a carrier for the member and does not leverage a tethering plan from the carrier for the member;
receiving a plurality of segments of a message from the STB through the proxy service over the PAN;
reassembling the message from the received message segments according a PAN protocol;
preparing the message for transmission over the WAN according to a WAN protocol; and
sending the prepared message to the remote server through the proxy service over the WAN according to the WAN protocol.

20. An apparatus comprising:
a serial connector configured to connect with a complementary serial connector of a set top box ("STB");
a personal area network ("PAN") transceiver configured to communicate over a PAN with a PAN transceiver-equipped computer within a range of the PAN, wherein the PAN provides a link through which the STB communicates with a remote server via the PAN transceiver and a proxy service created as a result of execution of a mobile application by the PAN transceiver-equipped computer, the proxy service including a communication path to the remote server via a wide area network (WAN), wherein the proxy service leverages an existing data service plan from a carrier for the PAN transceiver-equipped computer and does not leverage a tethering plan from the carrier for the PAN transceiver-equipped computer;
a memory in which a plurality of software instructions are stored; and
a processor in cooperation with the serial connector, PAN transceiver, and memory, the processor configured to execute the software instructions to (1) receive data from the STB via the serial connector, (2) form a message according to a PAN protocol based on the received data, and (3) send the message to the PAN transceiver-equipped computer via the PAN transceiver according to the PAN protocol for delivery to the remote server via the proxy service; and
wherein the serial connector, PAN transceiver, memory, and processor are arranged as a distinct PAN transceiver unit that is connectable to the STB via the respective complementary serial connectors of the PAN transceiver unit and the STB.

21. The apparatus of claim 20, further comprising status indicator lights configured to provide a user interface and status information about the PAN transceiver unit.

22. The apparatus of claim 20, wherein the PAN transceiver comprises a Bluetooth transceiver.

23. A method comprising:
connecting a distinct personal area network ("PAN") transceiver unit with a set top box ("STB"), wherein the PAN transceiver unit comprises (1) a serial connector, (2) a personal area network ("PAN") transceiver, (3) a memory in which a plurality of software instructions are stored, and (4) a processor in cooperation with the serial connector, PAN transceiver, and memory, the processor configured to execute the software instructions, wherein the connecting step comprises connecting the serial connector of the PAN transceiver unit with a complementary serial connector of a set top box ("STB");
establishing a personal area network ("PAN") connection between the PAN transceiver unit and a PAN transceiver-equipped computer via the respective PAN transceivers of the PAN transceiver unit and the PAN transceiver-equipped computer, wherein the PAN connection provides a link through which the STB communicates with a remote server via the PAN transceiver unit and a proxy service created as a result of execution of a mobile application by the PAN transceiver-equipped computer, the proxy service providing a communication path to the remote server via a wide area network (WAN), wherein the proxy service leverages an existing data service plan from a carrier for the PAN transceiver-equipped computer and does not leverage a tethering plan from the carrier for the PAN transceiver-equipped computer;
the processor, via execution of the software, (1) receiving data from the STB via the complementary serial connectors of the STB and the PAN transceiver unit, (2) forming a message according to a PAN protocol based on the received data, and (3) sending the message to the PAN transceiver of the PAN transceiver unit;
the PAN transceiver of the PAN transceiver unit wirelessly communicating the message to the PAN transceiver-equipped computer via the PAN connection for delivery to the remote server via the proxy service.

24. An apparatus comprising:
a set top box ("STB"), the STB comprising:
a metal chassis;
a plastic front panel;
a processor;
a memory;
a graphics unit; and
a personal area network ("PAN") transceiver configured to wirelessly communicate over a PAN with a PAN transceiver-equipped computer within a range of the PAN, wherein the PAN transceiver is mounted outside the metal chassis but inside the plastic front panel, wherein the PAN provides a link through which the STB communicates with a remote server via the PAN transceiver and a proxy service created as a result of execution of a mobile application by the PAN transceiver-equipped computer, the proxy service providing a communication path to the remote server via a wide area network (WAN), wherein the proxy service leverages an existing data service plan from a carrier for the PAN transceiver-equipped computer and does not leverage a tethering plan from the carrier for the PAN transceiver-equipped computer;

wherein the processor, memory, and graphics unit are configured to cooperate to process and output video content for display on a connected television; and wherein the processor is further configured to: (1) form a message according to a PAN protocol, the message including data for communication to the PAN transceiver-equipped computer, and (2) command the PAN transceiver to send the message to the PAN transceiver-equipped computer according to the PAN protocol for delivery to the remote server via the proxy service.

25. The apparatus of claim 24, further comprising status indicator lights configured to provide a user interface and status information about the PAN.

26. The apparatus of claim 24, wherein the PAN transceiver comprises a Bluetooth transceiver.

27. The system of claim 7, wherein the STB is further configured to communicate the channel changes to the PAN transceiver during live watching of television programming by a viewer.

28. The system of claim 1, wherein the mobile application is a downloaded mobile application.

29. The system of claim 28, wherein the portable computer comprises a smart phone.

30. The system of claim 1, wherein the STB further comprises a metal chassis, and wherein the PAN transceiver unit is mounted outside the STB's metal chassis.

31. The system of claim 30 wherein the STB further comprises a plastic front bezel, and wherein the PAN transceiver unit is mounted behind the STB's plastic front bezel but outside the STB's metal chassis.

32. The system of claim 1, wherein the serial connectors of the STB and the PAN transceiver unit comprise a member of the group selected from (1) USB connectors, (2) Serial Peripheral Interface ("SPI") connectors, (3) RS-232 connectors, and (4) flexible peripheral interconnectors ("FPI").

33. The method of claim 10, further comprising downloading the mobile application to the portable computer.

34. The method of claim 33, wherein the portable computer comprises a smart phone.

35. The method of claim 10, wherein the STB further comprises a metal chassis, and wherein the PAN transceiver unit is mounted outside the STB's metal chassis.

36. The method of claim 35 wherein the STB further comprises a plastic front bezel, and wherein the PAN transceiver unit is mounted behind the STB's plastic front bezel but outside the STB's metal chassis.

37. The computer program product of claim 11, wherein the mobile application is a downloaded mobile application.

38. The computer program product of claim 37, wherein the portable computer comprises a smart phone.

39. The computer program product of claim 38, wherein the message comprises an authorization request with respect to video on demand (VOD) content.

40. The computer program product of claim 38, wherein the message comprises data indicative of channel changes made by a viewer during live watching of television programming.

41. The computer program product of claim 38, wherein the message comprises diagnostic data regarding the STB.

42. The computer program product of claim 11, wherein the STB is connected to a PAN transceiver unit through which the STB is paired with the portable computer via the PAN connection.

43. The apparatus of claim 16, wherein the member is the smart phone.

44. The apparatus of claim 43, wherein the mobile application is a downloaded mobile application.

45. The apparatus of claim 43, wherein the message comprises an authorization request with respect to video on demand (VOD) content.

46. The apparatus of claim 43, wherein the message comprises data indicative of channel changes made by a viewer during live watching of television programming.

47. The apparatus of claim 43, wherein the message comprises diagnostic data regarding the STB.

48. The apparatus of claim 16, wherein the STB is connected to a PAN transceiver unit through which the STB communicates over the PAN connection.

49. The method of claim 19, wherein the member is the smart phone.

50. The method of claim 49, further comprising downloading the mobile application onto the smart phone.

51. The method of claim 49, wherein the message comprises an authorization request with respect to video on demand (VOD) content.

52. The method of claim 49, wherein the message comprises data indicative of channel changes made by a viewer during live watching of television programming.

53. The method of claim 49, wherein the message comprises diagnostic data regarding the STB.

54. The method of claim 19, wherein the STB is connected to a PAN transceiver unit through which the STB communicates over the PAN.

55. The apparatus of claim 20, wherein the message comprises an authorization request with respect to video on demand (VOD) content.

56. The apparatus of claim 20, wherein the message comprises data indicative of channel changes made by a viewer during live watching of television programming.

57. The apparatus of claim 20, wherein the message comprises diagnostic data regarding the STB.

58. The apparatus of claim 20, wherein the PAN transceiver-equipped computer comprises a smart phone that includes the mobile application configured to create the proxy service.

59. The apparatus of claim 20 wherein the PAN transceiver unit is configured for mounting outside a metal chassis of the STB.

60. The apparatus of claim 59 wherein the PAN transceiver unit is configured for mounting inside a plastic front bezel of the STB but outside the STB's metal chassis.

61. The method of claim 23, wherein the message comprises an authorization request with respect to video on demand (VOD) content.

62. The method of claim 23, wherein the message comprises data indicative of channel changes made by a viewer during live watching of television programming.

63. The method of claim 23, wherein the message comprises diagnostic data regarding the STB.

64. The method of claim 23, wherein the PAN transceiver-equipped computer comprises a smart phone executing the mobile application to create the proxy service.

65. The method of claim 23 further comprising mounting the PAN transceiver unit outside a metal chassis of the STB.

66. The method of claim 65 wherein the mounting step comprises mounting the PAN transceiver unit inside a plastic front bezel of the STB but outside the STB's metal chassis.

67. The apparatus of claim 24, wherein the message comprises an authorization request with respect to video on demand (VOD) content, and wherein the processor is further configured to condition a playback of the VOD content on the connected television on receipt of an authorization message for the VOD content.

68. The apparatus of claim 24, wherein the message comprises data indicative of channel changes made by a viewer during live watching of television programming.

69. The apparatus of claim 24, wherein the message comprises diagnostic data regarding the STB.

70. The system of claim 1, wherein the server is further configured to send the authorization message to the STB via the proxy service.

71. The system of claim 1, wherein the server is further configured to send the authorization message to the STB via a satellite link to the STB.

* * * * *